(Load-elongation curves of the filaments in dry and wet conditions)(at 20°C)

Fig.1-i.

(Conventional Process)
- Polyvinyl alcohol
  - Polymerization degree:1700
  - Polymerization temp. : 60°C
- Heat stretch ratio : 5.5 times
- Heat shrinkage ratio : 15%
- After heat treatment → Direct benzalization
- Benzalization degree : 27%

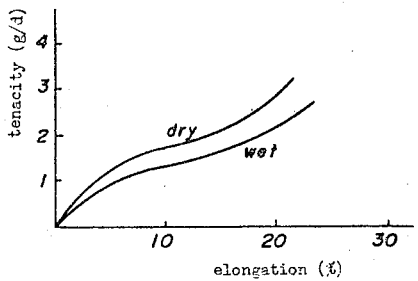

Fig.1-ii.

(Process by the Present invention)
- Polyvinyl alcohol
  - Polymerization degree:1700
  - Polymerization temp. :60°C
- Heat stretch ratio :9.5 times
- Heat shrinkage ratio :20%
- After heat treatment→Pretreatment by aqueous solution of phenol(50g/l, 50°C, 3 hr.)→Benzalization
- Benzalization degree: 14.8%

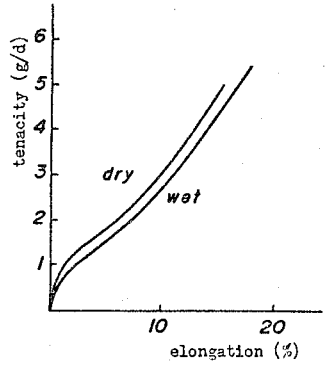

Fig.1-iii.

(Process by the Present invention)
- Polyvinyl alcohol
  - Polymerization degree:1200
  - Polymerization temp. :0°C
- Heat stretch ratio :10 times
- Heat shrinkage ratio :20%
- After heat treatment→Pretreatment by aqueous solution of phenol (50g/l, 80°C, 3 hr.)→ Benzalization
- Benzalization degree :15.1%

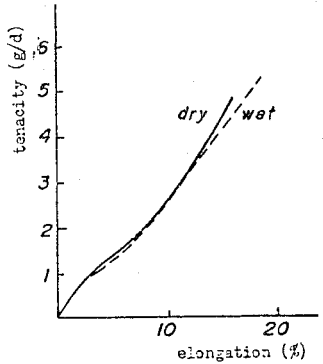

(Load-elongation curves of the filaments after acetalization and before and after hot water treatment (dry condition)
1. S-S curves of filament after acetalization(product) → drying (at 20°C)
2. S-S curves of filament after acetalization → hot water treatment by boiling water for 2 hours → drying (at 20°C)

Fig. 2-i.

(Process by the Present invention)
Heat stretch ratio: 10 times  } Pretreatment by
Heat shrinkage ratio: 20% } aqueous solution → Benzalization
of Phenol Benzalization degree: 14.5%

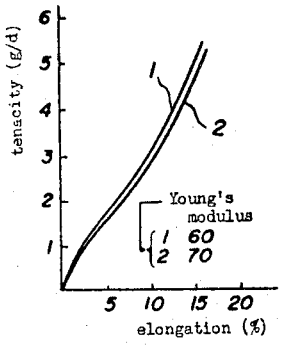

Fig. 2-ii.

(Conventional Process)
Heat stretch ratio: 4.8 times } Benzalization
Heat shrinkage ratio: 16% } (without pretreatment)

Benzalization degree: 20.0%

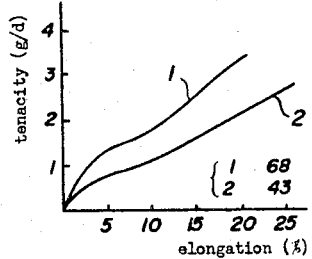

Fig. 2-iii.

(Conventional Process)
Heat stretch ratio: 7.0 times } Benzalization
Heat shrinkage ratio: 20% } (without pretreatment)

Benzalization degree: 19.3%

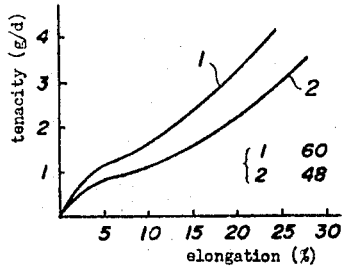

* same PVA has been used for the above experiments  { polymerization degree: 1700
polymerization temp: 60°C }

United States Patent Office 3,345,446
Patented Oct. 3, 1967

3,345,446
METHOD OF MANUFACTURING SYNTHETIC
FIBERS OF POLYVINYL ALCOHOL
Hirotoshi Kurashige, Kurashiki, Japan, assignor to Kurashiki Rayon Company Limited, Kurashiki City, Japan, a corporation of Japan
Filed July 10, 1963, Ser. No. 294,047
Claims priority, application Japan, Aug. 9, 1962, 37/32,946
4 Claims. (Cl. 264—205)

The present invention relates to a method of manufacturing synthetic fibers of polyvinyl alcohol which is characterized in that the invention, in the manufacture of synthetic fibers of polyvinyl alcohol (abridged as PVA).

(1) Use is made of a spinning solution consisting of polyvinyl alcohol or essentially thereof.

(2) Use is made of such a polyvinyl alcohol as manufactured by low temperature polymerized polyvinyl acetate having the polymerization temperature of −60 to 20° C. (hereafter called as low temperature polymerized PVA).

(3) Or use is made of low polymerization degree polyvinyl alcohol having the degree of polymerization within the range of 900 to 1,500.

Thus the fiber obtained by dry spinning or semi-melt spinning is subjected to the heat stretch of high rate such as 5 to 12 times of total stretch ratio after spinning, if necessary, subjected to heat shrinkage of 5 to 30% or heat treatment under the constant length successively to the heat stretch and then the fiber after said heat treatment is subjected to the pre-treatment by dipping the fiber in an aqueous solution of phenolic compounds such as phenol, cresol and the like, boron compounds such as boric acid and borax or aldehyde compounds such as formalin, acetaldehyde and the like, afterwards washed with cool water and warm water if necessary, and either drying or without drying said pre-treated fiber is succeedingly subjected to acetalization reaction, wherein benzaldehyde, chlorobenzaldehyde, tetrahydrobenzaldehyde, naphthaldehyde and the like aromatic, hydroaromatic, or polycyclic aldehydes, ketones or acetals thereof are combined with the fiber.

The object of the invention is to easily manufacture synthetic fibers of PVA having good properties such as higher tenacity, improved hot water resistance, stability in length and size, good elasticity and quick crease recovery, giving stabilization, compactness and hydrophobic nature to the fiber.

PVA fibers usually improve the elasticity by effecting acetalization with aromatic aldehydes such as benzaldehyde after the heat treatment so that such process has usually been adopted. On the other hand, when the fiber after heat treatment is subjected directly to acetalization by means of aromatic higher aldehydes the heat stretch of the total stretch ratio after spun has been usually taken to a comparatively low range such as 3 to 6 times. Accordingly, the fibers after the acetalization has not so high tenacity since the heat stretch ratio is not so high and hot water resistance is also comparatively low relatively to the degree of acetalization so that the stability in the length and size and also elasticity are not good so that the crease recovery is not sufficient as the fibers to be used for clothings.

After various investigations had been made for the improvement of elasticity and crease recovery of the synthetic fibers of PVA the inventors have found that in order to improve the elasticity and crease recovery, more particularly anti-crease nature under the wet condition, the following conditions are necessary:

(1) The larger the hot stretch of the fiber the better improvement is obtained.

(2) The lower the polymerization degree of PVA to be used the better the improvement.

(3) The lower the polymerization temperature of the PVA used (actually the polymerization temperature of polyvinyl acetate before saponification) better is the recovery.

(4) The larger the degree of acetalization by reacting aromatic, hydroaromatic or polycyclic aldehydes the better up to 22 to 23 mol percent.

(A) By increasing the heat stretch of the fiber its structure is made compact and the resistance to water such as hot water resistance after heat treatment is increased.

(B) By lowering the polymerization degree of PVA it is made to easily accept the heat treatment effect, and by enlarging the molecular orientation and crystallization degree, the resistance to water of the fiber after heat treatment is increased.

(C) By lowering the polymerization temperature of polyvinyl acetate before saponification for manufacturing PVA to be used the stereo-regularity of molecular structure of PVA is enlarged and by compacting the structure of fiber the resistance to water is improved.

(D) By the additional reaction of aromatic hydroaromatic, polycyclic and the like hydrophobic aldehydes the hydrophobicity of the fiber after the acetalization is increased.

It has been found by the inventors that even if an ordinary PVA polymerized at a conventional polymerization temperature is used, if after the high rate of heat stretch said pre-treatment is effected with the above described aqueous solution for the pre-treatment and then the acetalization is effected by means of aromatic aldehydes, the properties of the fiber is considerably improved and the higher the rate of heat stretch and the lower the polymerization degree of the used PVA and the lower the polymerization temperature the larger is the degree of improvement and its ideal when the used PVA has a lower polymerization degree and is a low temperature polymer.

As shown in Table 1, when PVA fiber after spun is subjected to a heat stretch of high ratio such as 5 to 12 times at a high temperature such as 180 to 250° C. the fiber after the heat treatment considerably increases the molecular arrangement and crystallization so that the hot water resistance is improved, but the speed of acetalization reaction is small due to a large decrease of the affinity to aldehydes having comparatively large molecular weight such as aromatic aldehydes so that even if the fiber after the heat treatment is directly acetalized the filament having a required acetalization degree can not be obtained. On the other hand, even in the fiber subjected to the heat stretch of high ratio and having low affinity, if the fiber after the heat treatment is subjected to the pre-treatment at room temperature to 100° C. in an aqueous solution of phenol, cresol and the like phenols, or formalin, acetaldehyde and the like aldehydes having swelling properties to PVA or an aqueous solution of borides forming easily metal chelate at a comparative low temperature with PVA such as boric acid or borax and thereafter washed with cool water or warm water if necessary, then either by drying or without drying and succeedingly continuously acetalized by a conventional process with aromatic, hydroaromatic, or polycyclic aldehydes, then the acetalization reaction is considerably accelerated and can be completed in a comparatively short time, thereby producing the fiber having a suitable acetalization degree.

TABLE 1

The relation between the heat stretch ratio of PVA filaments and the affinity to benzaldehyde of the filament after heat treatment.

It is shown by the degree of benzalization when the filament after the heat treatment is directly benzalized.

| Heat stretch ratio (230° C.) | Heat shrinkage ratio (230° C.), percent | Degree of benzalization (mol percent) | |
|---|---|---|---|
| | | PVA (polymerization: degrees, 1,700; temp., 60° C.), percent | PVA (polymerization: degrees, 1,200; temp., 0° C.), percent |
| 4 times | 20 | 26.5 | 23.5 |
| 7 times | 20 | 20.3 | 9.5 |
| 10 times | 20 | 7.0 | 3.4 |

*Condition of benzalization:
  Benzaldehyde _____ 20 g./lit.
  $H_2SO_4$ _____ 150 g./lit.   } 60° C., 6 hrs.
  Methanol _____ 350 g./lit.

As shown in Table 2 the lower the degree of polymerization and the polymerization temperature of used PVA, the lower is the affinity to the high aldehyde if compared with the same heat stretch ratio so that when such PVA is used and subjected to the heat treatment of high stretch ratio, the pre-treatment with an aqueous solution for the pre-treatment becomes indispensable and has important significance.

TABLE 2

The relation between the degree of polymerization and polymerization temperature of PVA and the affinity to benzaldehyde after the heat treatment:

| PVA | | Benzalization degree of filament after the heat treatment (mol percent) | | |
|---|---|---|---|---|
| Polymerization degree | Polymerization temp., °C. | Filament after heat treatment → Direct benzalization | Filament after heat treatment → Pre-treatment by aqueous solution of phenol → Benzalization | |
| 1,700 | 60 | 7.0 | 21.4 | |
| 1,700 | 0 | 5.5 | 15.3 | |
| 1,200 | 60 | 4.6 | 13.0 | |
| 1,200 | 0 | 3.4 | 8.3 | |

*Condition of heat treatment (heat stretch ratio: 10 times 230° C.).
*Heat shrinkage ratio: 20% (230° C.) constant.
*Pre-treatment with an aqueous solution of phenol (phenol: 50 g./lit., 60° C., 3 hours) constant.
*Benzalization condition: Same as Table 1.

The condition of pre-treatment by using an aqueous solution of the pre-treatment agent should be made more severe as the heat stretch ratio is larger, the heat shrinkage ratio after the heat stretch is smaller, the amount of constant length heat treatment after the heat stretch is larger, the degree of polymerization of used PVA is lower, and the polymerization temperature of the used PVA is lower. The concentration of the pre-treatment agent is commercially advantageous by effecting at about 3 to 10% and the pre-treatment may be effected at a suitable temperature from room temperature to 100° C. according to the difference in the above conditions.

As above described, if the fiber after the heat treatment is subjected to the pre-treatment with an aqueous solution of phenol and the like pre-treatment agent and then acetalized the fiber having substantial degree of acetalization can be obtained comparatively easily, that is, fibers having the acetalization degree which can never be attained by a conventional process can be obtained and it has a great advantage that the acetalization time can be shortened at some stretch ratio. For instance, the filament after spun by using PVA having the degree of polymerization of 1,200 and polymerization temperature of 0° C. is subjected to the 10 times heat stretch at 225° C. and succeedingly effected to the heat shrinkage of 20% at 230° C., then the filament after the heat treatment could not give only the filament having low degree of acetalization of 3.4 mol percent even subjected to the acetalization for 6 hours by the direct benzalization for a filament after the heat treatment by means of a conventional benzalization bath. When the filaments after the heat treatment is subjected to the pre-treatment at 80° C. for 3 hours in an aqueous solution of phenol having concentration of 50 g./lit. and subjected to the benzalization for 6 hours by a conventional method, then the filament having acetalization degree of 17.2% can be obtained. Thus, the filament having the acetalization degree which can never be obtained by a conventional method was enabled to provide. Moreover, the filament spun by using a similar PVA subjected to the heat stretch of 7 times at 225° C. and successively subjected to the heat shrinkage of 20% at 230° C. could give only low acetalization degree of 9.1 mol percent by subjecting the filament after the heat treatment to the direct benzalization in an ordinary benzalization bath even for 6 hours. The filaments after thus being heat treated is subjected to the pre-treatment for 3 hours at 60° C. in an aqueous solution of phenol having concentration of 50 g./lit. and then subjected to the benzalization in an ordinary benzalization bath for 3 hours the filaments after the acetalization showed the degree of acetalization of 18 mol percent, that is, it enabled to obtain the filament having the acetalization degree which could not be obtained by a conventional method and at the same time the acetalization time was shortened.

The fibers after acetalization according to the method of the invention is superior in all respects of the properties of the fibers if compared with the filament made by a conventional process. Speciality and merits of the quality of fiber are mentioned as follows.

(1) Owing to the high rate of heat stretch and somewhat lower acetalization degree in comparison with fibers of known methods the fiber of the invention has considerably high tenacity.

(2) The fiber has improved hot water resistance and better high temperature water resistance compared with the conventional fibers and the solving temperature is raised by 5 to 13° C. so that it increases from about 107° C. of the former process to 112 to 120° C. and the hot water resistance exhibits higher value for lower degree of polymerization and polymerization temperature of PVA.

(3) The fiber after acetalization according to the invention has very good stability in the length and sizes in hot water and the larger the stretch ratio and the lower the polymerization degree and polymerization temperature of PVA the larger is the stability.

According to the present method a certain shrinkage is caused at the pre-treatment, but at the acetalization following thereto substantially no change occurs in the length of the fiber. In other words, since the acetalization is effected after the length of fiber has been sufficiently stabilized it is considered that the stability of the length of the fiber is improved. The stability in the length and dimension of the fiber in hot water are shown in Table 3.

TABLE 3

| | PVA | | Heat elongation (times) | Heat shrinkage, percent | Pre-treatment in aqueous solution of phenol (50 g./lit. 3 hrs.), °C. | Benzalization degree (mol percent) | Shrinkage in hot water (shrinkage percent after 30 min.) | | | |
|---|---|---|---|---|---|---|---|---|---|---|
| | Polymerization degree | Polymerization temp., °C. | | | | | 100° C. | 105° C. | 110° C. | 115° C. |
| Filament by ordinary process | 1,700 | 60 | 6 | 20 | None | 20.5 | 2.5 | 7.0 | (1) | (1) |
| Filament by present invention | 1,700 | 60 | 10 | 20 | 50 | 16.8 | 0 | 1.0 | 4.0 | (1) |
| | 1,200 | 60 | 10 | 20 | 70 | 15.4 | 0 | 0 | 3.0 | (1) |
| | 1,200 | 0 | 10 | 20 | 80 | 17.2 | 0 | 1.0 | 1.0 | 2.0 |

[1] Dissolved.

(4) The fiber after the acetalization according to the method of the invention, if compared with the fibers by conventional process, has speciality not to be affected by water as the fiber structure is made compact. The speciality not affected by water can be clearly recognized by the following phenomena.

(a) As shown by Table 4 the values of Young's modulus in dry and wet states are more close if compared with those of a conventional filament and in the latter the Young's modulus in wet state is pretty much lower than that in dry state.

TABLE 4

| | PVA | | Heat elongation (times) | Heat shrinkage, percent | Pre-treatment in aqueous solution of phenol (50 g./lit. 3 hrs.) °C. | Benzalization degree (mol percent) | Young's Modulus (g./l.) | |
|---|---|---|---|---|---|---|---|---|
| | Polymerization degree | Polymerization temp., °C. | | | | | Dry | Wet |
| Filament by ordinary process | 1,700 | 60 | 5 | 15 | None | 22.3 | 54 | 28 |
| Filament by the present invention | 1,700 | 60 | 10 | 20 | 50 | 17.1 | 68 | 56 |
| | 1,200 | 0 | 10 | 20 | 80 | 15.1 | 56 | 46 |
| | 1,200 | 0 | 10 | 10 | 90 | 15.1 | 70 | 60 |

For a better understanding of the invention, reference is taken to the accompanying drawings, in which FIG. 1–i illustrates load-elongation curves of benzalized PVA filament manufactured by a conventional process;

FIG. 1–ii illustrates load-elongation curves of the benzalized PVA filament as an example, wherein an ordinary PVA is subjected to a high rate of heat stretch and then subject to phenol treatment and afterwards, benzalization;

FIG. 1–iii illustrates load-elongation curves of PVA filament of low polymerization degree manufactured by polyvinyl acetate which was polymerized at a low temperature as an embodiment of the invention;

FIG. 2–i illustrates load-elongation curves of benzalized PVA filament manufactured by the method of the invention before and after hot water treatment;

FIG. 2–ii illustrates load-elongation curves taken for the comparison of benzalized PVA filament manufactured by a conventional process before and after hot water treatment;

FIG. 2–iii illustrates load-elongation curves of benzalized PVA filament which after spun and high rate of heat stretch no pre-treatment is effected, before and after hot water treatment.

(b) As shown in FIG. 1 the load-elongation curves of the filaments after acetalization according to the method of the invention at dry and wet states are very close together, while FIG. 1–i illustrates those of the filament made according to the ordinary process of which load-elongation curves at dry and wet states are considerably apart from each other and the curve at wet condition is sloped downwards. FIG. 1–ii showing those of the invention using the same PVA, the load-elongation curves at wet and dry conditions are pretty close as apparent from the drawing and in case of low degree of polymerization according to the present method as shown in FIG. 1–iii, wherein PVA having low degree of polymerization and polymerized at lower temperature is used the load-elongation curves under the dry and wet conditions are almost overlapped.

(c) In the filaments made by the method of the invention, as shown in FIG. 2, no substantial difference can be recognized for the dry-load and elongation curves even subjected to the hot water treatment in boiling water and the filament according to the invention as shown in FIG. 2–i shows no change in the load-elongation curve by subjecting to the hot water treatment without causing lowering of the strength, elongation and Young's modulus, i.e., it shows that the filament is not substantially effected by boiling water. On the other hand, in the filaments according to known process as shown in FIGS. 2–ii and 2–iii the dry load-elongation curves after hot water treatment are inclined downwards for a pretty large extent if compared with the load-elongation curves before the hot water treatment and the breaking strength is lowered and the elongation to break down is increased and Young's modulus for both of dry and wet conditions are reduced and also elongation elasticity is reduced. Thus it will be apparent that the fiber of a conventional process is liable to be affected by boiling water.

(5) In the fibers according to the method of the invention the value of recovering elongation elasticity after subjecting to the heat stretch of high ratio is pretty much increased compared with that of the fibers made by conventional process and the lower the degree of polymerization of used PVA and the lower the temperature of polymerization the value of recovering elasticity is further improved. Accordingly, a fabric using the fibers of the method of the invention after being subjected to acetalization shows pretty good improvement of elastic recovery and crease recovery under dry condition if compared with those of the fabric made by a conventional process and more particularly, anti-crease properties under wet condition is very good since the fiber structure is made compact and the resistance to water is increased, that is, it has so-called wash and wear property so that it provides a large improvement as fibers for use in clothes. The above advantages could never have been even considered in vinylon fibers made by conventional process.

(6) In the acetalization by means of aromatic group, hydroaromatic group, etc., the acetalization degree by the method of the invention is sufficient for the quality of fibers with the extent of 13 to 20%. Since the degree of acetalization is lower compared with 18 to 30% of the degree of acetalization of the fiber of conventional method the quantity of acetalizing agent to be used can be economized. Further the fibers of the invention, owing to the heat stretch of high ratio and very good hot water resistance and also the lower acetalization degree if compared with that of a conventional fiber, the dyeability to dispersion or cation dyestuff shows somewhat lower value at a temperature of 90° C. which is the standard dyeing temperature for conventional PVA fibers, yet owing to the recovery of dyeing property by the pre-treatment the dyeing property is good with such high rate of stretch and low degree of acetalization and by effecting boiling dyeing it exhibits almost same degree of dyeability as the common PVA fibers to the dispersion and cation dyestuffs so that there is no difficulty as to the dyeing properties. Moreover, since the hot water resistance is good it has advantages of that the dyeing with boiling dyestuff can be effected safely, whereas the dyeing velocity is slow if compared with conventional PVA fibers so that it has advantage that more uniform dyeing is resulted. Since dry spinning or semi-fusion spinning process is taken and the sectional structure of the fiber is uniform the colour developing nature of the dyed fibers is specially better than that of PVA fibers spun by a conventional wet spinning. Moreover, the dyed fiber of the invention, as it not affected by water due to the compact structure, have better colouring fastness than that of conventional PVA fibers.

"The heat stretch of high stretch ratio" used in the specifications and claims means the range of 5 to 12 times stretch, which corresponds to the range of heat stretch ratio, wherein the degree of crystallization and orientation of molecules become large by such heat stretch and the hot water resistance is improved and the affinity to the aldehydes having comparatively large molecular weight is reduced and the pre-treatment is better utilized and when the degree of polymerization of used PVA is comparatively high and the temperature of polymerization is high the heat stretch ratio of 8 to 12 times is usually adapted, while if the degree of polymerization and the temperature of polymerization are low the effect of heat treatment becomes large, and when the hot water resistance of the fiber after the heat stretch is good due to the improvement of regularity of molecular structure of PVA itself the heat stretch ratio of 5 to 10 times is usually adopted.

"The heat stretch for the total stretch ratio after spun" in the specifications and claims means the stretch ratio on the fiber which is spun by a dry spinning or semi-fusion spinning and on the first roller in the spinning process after spun or wound up without applying too large a stretch after the first roller. Accordingly, an ordinary heat stretch means the heat stretch of 5 to 12 times effected at 180 to 250° C. for the fiber wound up after the first roller without applying too high a stretch, but as special cases the following methods can be adopted, i.e. a method of winding up the fiber after the first roller in the spinning step by applying the stretch of a suitable ratio at a temperature between room temperature to 250° C., and then winding up the fiber after subjecting to heat stretch at a temperature from 180 to 250° C., and making the total stretch ratio after the first spinning roller as 5 to 12 times, and another method in which after the first spinning roller the spun fiber is subjected to the heat stretch successively from room temperature to 250° C. by changing the temperature step-by-step so as to make the total stretch ratio after the first spinning roller as 5 to 12 times and then the fiber is wound up.

The invention will now be described more in detail with reference to the following examples.

*Example 1*

A spinning solution of PVA having the degree of polymerization 1,700 and polymerization temperature at 60° C. is used to dry spinning and the filament was subjected to cold stretch of 5% between the first spinning roller and the hot roller, and after being dried on the hot roller the filament is wound up and obtained a long filament of PVA. The filament thus spun was heat stretched for 10 times at 230° C. by a heat treatment apparatus in air bath and successively hot shrinkage of 20% of at 230° C., then the long filament after the heat treatment was dipped into an aqueous solution phenol having concentration of 50 g./lit. and subjected to the pre-treatment at a temperature of 50° C. for 3 hours and after the thus pre-treated filaments was water washed and then washed with warm water at 60° C. and air dried. The filament thus air dried was acetalized at 60° C. for 6 hours in an acetalization bath of benzaldehyde consisting of 2% benzaldehyde, 15% sulfuric acid, 35% methanol and 48% of water and obtained the filament after acetalization having 14.5% of acetalization degree. The quality of the long filament after the acetalization was as shown in the following table, wherein the filament is shown as a contrast filament with a long filament after benzalization of the filament made by a conventional method by using the same PVA and by dry spinning process.

| | Acetalization degree (percent) | Dr./number of filaments | Dry | | | Wet | | | Dry elongation elasticity | | Hot water resistance (shrinkage after 30 min.), percent | | |
|---|---|---|---|---|---|---|---|---|---|---|---|---|---|
| | | | Tenacity (g./d.) | Elongation (percent) | Knotting strength (g./d.) | Tenacity (g./d.) | Elongation (percent) | Knotting strength (g./d.) | 3% | 5% | 100° C. | 105° C. | 110° C. |
| Filament by ordinary process | 19.3 | 80/20 | 3.51 | 25.3 | 2.34 | 3.40 | 28.6 | 2.47 | 74.0 | 61.0 | 3.5 | 7.0 | .60 |
| Filament by present invention | 14.2 | 80/20 | 5.33 | 16.4 | 3.83 | 5.59 | 17.5 | 3.77 | 83.0 | 72.0 | 0 | 0.5 | 8.0 |

As apparent from the above table, the filament had high tenacity, good elongation elasticity, hot water resistance and stable length. The fabrics using the filaments showed much better anti-crease property under wet condition than that of a conventional filament.

*Example 2*

The filament in the similar manner as in Example 1 and subjected to the heat treatment was subjected to pre-treatment at 60° C. for 3 hours in an aqueous solution of phenol having concentration of 50 g./lit. and after washing with water and then with warm water at 60° C. the filament under the wet condition after washing was subjected to the acetalization in the same manner as in Example 1 and obtained the filament after acetalized filament having the degree of acetalization of 15.4%. The quality of the long filament thus obtained after acetalization showed very good quality almost the same as that of Example 1.

*Example 3*

A spinning solution of PVA having the degree of polymerization 1,700 at a polymerization temperature of 60° C. was used for dry spinning and obtained long filaments of PVA after spun and the filaments were heat stretched to 9.5 times at 230° C. and succeedingly heat shrinkage of 20% at 230° C. The long filament after treatment after the heat treatment was subjected to the pre-treatment in an aqueous solution of borax having concentration of 30 g./lit. at 70° C. for 3 hours and then washed with water and succeedingly with warm water at 60° C., and dried at 60° C., then acetalized with benzaldehyde in a similar manner as Example 1 thus yielded filaments having acetalization degree of 13.7%.

The qualities of the long filament thus acetalized are shown in the following table.

| Single filament | Dry | | Wet | | Knotting strength (g./d.) | | Young's modulus (g./d.) | | Hot water resistance (shrinkage after 30 min.), percent | | | Value of elastic recovery (percent) | | | |
| | | | | | | | | | | | | Immediate elastic recovery, | | Delayed recovery after 2 min. | |
| | Tenacity (g./d.) | Elongation (percent) | Tenacity (g./d.) | Elongation (percent) | Dry | Wet | Dry | Wet | 100° C. | 105° C. | 110° C. | 3% | 5% | 3% | 5% |
| 4.0 | 50 | 17.3 | 4.77 | 18.5 | 2.30 | 2.70 | 69 | 58 | 0 | 1.0 | 3.0 | 71 | 57 | 94 | 79 |

| Dr./number of filaments | Dry | | Wet | | Knotting strength (g./d.) | | Young's modulus (g./d.) | | Elongation elasticity, percent | | Hot water resistance, percent | |
| | Tenacity (g./d.) | Elongation (percent) | Tenacity (g./d.) | Elongation (percent) | Dry | Wet | Dry | Wet | 3% | 5% | 100° C. | 105° C. |
| 78/30 | 5.86 | 17.0 | 6.10 | 19.7 | 3.53 | 3.86 | 75 | 60 | 80.5 | 70.2 | 0 | 1.5 |

As apparent from the above table, the tenacity of the filament is very high and the elongation elasticity, hot water resistance and stability in length were very good.

*Example 4*

The spinning and heat treatment were effected in the similar manner to Example 3 and the long filament obtained by the heat treatment was treated in an aqueous solution of formalin having a concentration of 60 g./lit. at 80° C. for 3 hours and water washed and washed in warm water at 60° C. and dried at 60° C.

The filament after drying was acetalized with benzaldehyde in the similar manner to Example 1 and obtained the filaments after acetalization having the degree of acetalization of 13.4%. The quality of the long filament after thus being acetalized was almost the same as that of Example 3.

*Example 5*

A spinning solution of PVA having the degree of polymerization of 1,200 and the temperature of polymerization at 60° C. was dry spun and during the spinning process the filament was dried by means of hot rollers having almost the same speed as the first roller at the roller temperature of 130° C. and then subjected to heat stretch of 4 times between said hot roller and the succeeding rollers at a temperature of 130° C. of hot roller, then the filament was wound up. The filament taken up by stretching four times in direct connection to said spinning was subjected to hot stretch for 2.5 times at 230° C. by means of heat treating apparatus using air bath and succeedingly hot shrinkage of 20% at 230° C. (the total stretch ratio after the first roller was 10 times). The long filament after the above heat treatment was assembled and cut to short fibers (without crimp) and subjected to the pre-treatment in an aqueous solution of phenol having concentration of 50 g./lit. at 60° C. for 3 hours, then washed with water and also with warm water and afterwards the fiber under the wet condition after washing was acetalized by means of benzaldehyde in the similar method to that of Example 1 and obtained the acetalized fibers having the degree of actalization of 17.5%.

The quality of thus acetalized fibers is shown in the following table:

As apparent from the table, it showed improved hot water resistance, tenacity, and elasticity recovery value.

*Example 6*

A spinning solution of PVA of polymerization degree of 1,200, polymerization temperature 0° C. was used to dry spinning and after the first roller in the spinning process not too large a stretch was applied to the filament and wound up, after drying by means of hot roller and taken up to obtain long filament of PVA. The filament thus spun was subjected to heat stretch of 10 times at 220° C. in a heat treating apparatus in air bath and successively heat shrinking for 20% at 230° C. and after the filaments thus heat treated were assembled, then (1) Cut to short fibers (without crimp)
(2) After mechanically crimped cut to short fibers (crimped fibers)

The short fibers (1) and (2) were charged in an acetalization tank in such a condition that the fiber density became about 0.4, then an aqueous solution of phenol having concentration of phenol of 50 g./lit. was passed uniformly through the fibers to effect the pre-treatment at 80° C. for 3 hours, successively washed with water and warm water in the similar manner as before, then the acetalization solution consisting of 2.5% benzaldehyde, 15% sulfuric acid 35% methanol was passed through the fibers to effect acetalization at 60° C. for 5 hours and obtained the acetalized fibers. The quality of thus acetalized fibers are as shown in the following table. In this table, the fiber obtained by a conventional process was used for the sake of contrast, which was the benzalized short fibers of PVA manufactured by a conventional wet spinning process and available on the market since there were almost no short fibers of PVA manufactured by dry spinning or semi-melt spinning.

|  | Filament | Dry | | Wet | | Knotting strength (g./d.) | | Young's modulus (g./d.) | |
|---|---|---|---|---|---|---|---|---|---|
|  |  | Tenacity (g./d.) | Elongation (percent) | Tenacity (g./d.) | Elongation (percent) | Dry | Wet | Dry | Wet |
| Filament by the present invention (1) noncrimped filament | 2.65 | 6.38 | 16.6 | 5.74 | 17.9 | 3.25 | 3.69 | 80 | 57 |
| Filament by the present invention (2) crimped filament | 2.64 | 5.00 | 16.5 | 5.30 | 17.6 | 3.35 | 3.70 | 40 | 38 |
| Filament by ordinary process (wet short crimped filament) | 2.96 | 3.90 | 20.3 | 3.60 | 21.7 | 2.33 | 2.50 | 54 | 28 |

|  | Benzalization degree (mol percent) | Recovery of elongation elasticity (percent) (dry) | | | | Crimped elasticity (percent) | Hot water resistance (shrinkage after 30 min. (%)) | | | |
|---|---|---|---|---|---|---|---|---|---|---|
|  |  | Instant recovery | | Recovery after 2 min. | | | 100° C. | 105° C. | 110° C. | 115° C. |
|  |  | 3% | 5% | 3% | 5% |  |  |  |  |  |
| Filament by the present invention (1) noncrimped filament | 17.2 | 80.0 | 63.0 | 92.2 | 82.5 |  | 0.5 | 1.0 | 1.0 | 1.0 |
| Filament by the present invention (2) crimped filament | 15.5 | 72.0 | 59.2 | 83.5 | 77.5 | 83.0 | 0 | 0 | 2.0 | 3.0 |
| Filament by ordinary process (wet short crimped filament) | 23.0 | 59.0 | 45.0 | 82.0 | 68.0 | 65.0 | 1.0 | 3.0 | 10.0 | (¹) |

¹ Dissolved.

As above mentioned, the fibers showed high tenacity and hot water resistance, good stability in length and elasticity. The fabrics made by using thus acetalized fibers showed special improvement in the anti-crease property compared with the fibers made by a conventional method, more particularly, the anti-crease property in wet state after washing was particularly improved.

Example 7

A spinning solution of PVA having polymerization degree 1,200 and polymerization temperature 0° C. was spun in the same manner as Example 6 and the filament after being spun was subjected to the heat treatment, assembling, mechanical crimping and cutting in the same manner as those in Example 6 and obtained the short crimped fiber after heat treatment. The short fiber thus obtained was subjected to the pre-treatment in an aqueous solution of phenol having concentration of 50 d./l. at 80° C. for 3 hours in an acetalization tank similar to Example 6 and after washed with cool water and warm water, subjected to acetalization in acetalization bath containing 1.5% naphthaldehyde, 15% sulfuric acid, 35% methanol and 48.5% water and yielded the acetalized fibers having acetalization degree of 12.3%. The quality of thus acetalized short fibers showed specially good elongation elasticity. The recovery of elongation elasticity (dry) (percent) (momentary recovery value) 3%:75.0%, 5%: 61.3%.

What I claim is:

1. A method for manufacturing polyvinyl alcohol fibers which comprises: subjecting spun polyvinyl alcohol fibers to heat stretching to a stretch ratio of 5–12 relative to the as spun fiber length; thereafter, subjecting the fibers to a 5–30% heat treatment shrinkage; then in succession treating the fibers with an aqueous solution of a compound selected from the group consisting of phenol, cresol, boric acid, borax, formalin and acetaldehyde, water washing the so treated fibers and acetalizing the fibers with an aromatic aldehyde.

2. The method set forth in claim 1, wherein the polyvinyl alcohol of said fibers is produced from polyvinyl acetate polymerized at a polymerization temperature of −60° C. to 20° C.

3. The method as set forth in claim 1, wherein the polyvinyl alcohol has a polymerization degree within the range of 900 to 1500.

4. A method for manufacturing polyvinyl alcohol fibers which comprises: subjecting spun polyvinyl alcohol fibers to heat stretching to a stretch ratio of 5–12 relative to the as spun length; thereafter, subjecting the fibers to a constant length heat treatment; then in succession treating the fibers with an aqueous solution of a compound selected from the group consisting of phenol, cresol, boric acid, borax, formalin and acetaldehyde, water washing the so treated fibers, and acetalizing the fibers with an aromatic aldehyde.

References Cited
UNITED STATES PATENTS

| | | | |
|---|---|---|---|
| 1,920,564 | 8/1933 | Jochum et al. | 264—185 |
| 2,072,303 | 3/1937 | Herrmann et al. | 264—185 |
| 3,027,224 | 3/1962 | Osugi et al. | 264—210 |
| 3,167,604 | 1/1965 | Aarakawa et al. | 264—185 |
| 3,170,973 | 2/1965 | Tanabe et al. | 264—185 |
| 3,240,738 | 3/1966 | Mitamara et al. | 264—185 |

ALEXANDER H. BRODMERKEL, *Primary Examiner.*

D. J. ARNOLD, *Assistant Examiner.*